United States Patent [19]

Delp

[11] Patent Number: 5,949,904
[45] Date of Patent: Sep. 7, 1999

[54] METHOD, APPARATUS AND COMPUTER PROGRAM PRODUCT FOR QUERYING BY IMAGE COLORS USING JPEG IMAGE FORMAT

[75] Inventor: Helen Roxlo Delp, Rochester, Minn.

[73] Assignee: International Business Machines Corporation, Armonk, N.Y.

[21] Appl. No.: 08/965,446

[22] Filed: Nov. 6, 1997

[51] Int. Cl.[6] .............................. G06K 9/00; G06K 9/36; G06K 9/46
[52] U.S. Cl. ......................... 382/165; 382/162; 382/232; 382/235; 382/250
[58] Field of Search .................................. 382/181, 195, 382/162, 165, 232, 233, 235, 250

[56] References Cited

U.S. PATENT DOCUMENTS

5,805,727  9/1998  Nakano ................................. 382/195

*Primary Examiner*—Bijan Tadayon
*Assistant Examiner*—Dmitry A. Novik
*Attorney, Agent, or Firm*—Joan Pennington

[57] ABSTRACT

A method, apparatus and computer program product are provided for querying by image colors using a JPEG format for images from the internet. First an image color is selected. A DCT coefficient is acquired from a JPEG image. The acquired DCT coefficient is compared with the selected image color. A match within the JPEG image is identified responsive to the acquired DCT coefficient being near the selected image color. An average color can be used for querying JPEG formatted images from the internet.

12 Claims, 11 Drawing Sheets

METHOD, APPARATUS AND COMPUTER PROGRAM PRODUCT FOR QUERYING BY IMAGE COLORS USING JPEG IMAGE FORMAT

FIELD OF THE INVENTION

The present invention relates generally to the data processing field, and more particularly, relates to a method, apparatus and computer program product for querying by image colors using Joint Photographic Experts Group (JPEG) format for images from the internet.

DESCRIPTION OF THE RELATED ART

Valuable information available on the internet or World Wide Web (WWW) is often difficult or cumbersome and time consuming to use for reviewing internet web pages using current technology.

Images are increasingly being used on the internet for example, in business applications, because of the standard internet viewing software. In an internet work group environment, images are easily distributed over the network and promote collaboration. However, because the files are usually large, management and location can be difficult. Viewing individual images to find the desired one is time consuming. Maintaining a list of key words describing each image is not effective because the desired key words vary with time, location, and industry.

Agents on the internet improve client efficiency by searching over many sites simultaneously for documents or pages containing certain key words. An analogous method of searching for images containing certain features is needed. One attribute of the image that people would like to query is the color contained within the image. A need exists for technology that enables flexible and efficient querying by image colors of internet web pages. As used in the following description and claims, querying by image colors includes querying by gray levels in a gray level image.

SUMMARY OF THE INVENTION

A principal object of the present invention is to provide an intelligent method, apparatus and computer program product for querying by image colors using JPEG format for images from the internet. Other important objects of the present invention are to provide such method, apparatus and computer program product for querying by image colors that efficiently and effectively facilitates searching of particular internet web pages to be reviewed; to provide such querying method, apparatus and computer program product substantially without negative effect; and provide such querying method, apparatus and computer program product that overcome many of the disadvantages of prior art arrangements.

In brief, a method, apparatus and computer program product are provided for querying by image colors using a JPEG format for images from the internet. First an image color is selected. A Discrete Cosine Transform (DCT) coefficient is acquired from a JPEG image. The acquired DCT coefficient is compared with the selected image color. A match within the JPEG image is identified responsive to the acquired DCT coefficient being near the selected image color.

In accordance with features of the invention, an average color can be used for querying JPEG formatted images from the internet.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
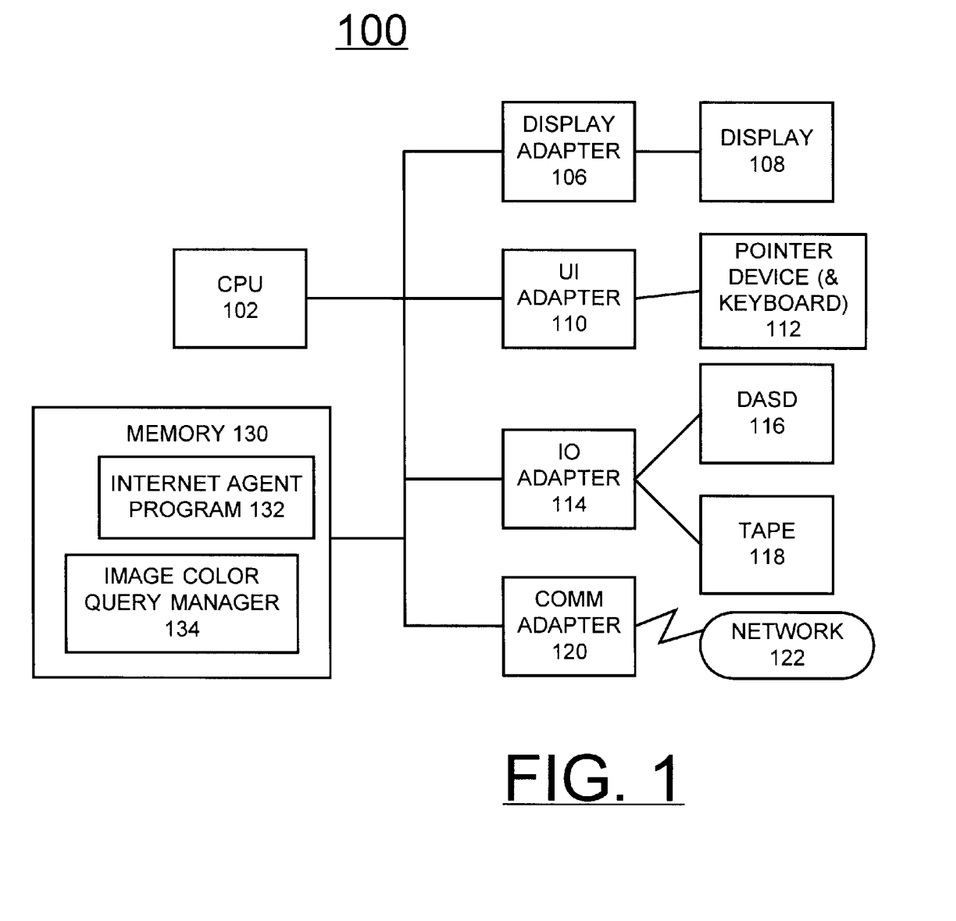
FIG. 1 is a block diagram representation illustrating a computer system for implementing a method for querying by image colors using a JPEG format for images from the internet in accordance with the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a display adapter 106 coupled to a display 108. CPU 102 is connected to a user interface (UI) adapter 110 connected to a pointer device and keyboard 112. CPU 102 is connected to an input/output (IO) adapter 114, for example, connected to a direct access storage device (DASD) 116 and a tape unit 118. CPU 102 is connected to a communications adapter 120 providing a communications network connection function with a network 122. The computer system 100 includes a memory 130, an internet agent program 132 and a image color query manager 134 of the preferred embodiment.

Central processor unit 102 is suitably programmed to execute the flow charts of FIGS. 2, 3, 4, 5, 6, 7, 8, 9, and 9A of the preferred embodiment.

Memory 130 is storage sufficiently large to hold the necessary programming and data structures. While memory 130 is shown as a single entity, memory 130 may in fact comprise a plurality of storage devices, and that memory may exist at multiple levels, from high-speed registers and caches to lower speed but larger DRAM chips, to floppy-disk drives, fixed-disk drives, tape drives, CD-ROM drives, or optical drives. Memory 130 can be loaded and stored between its various levels as needed. While memory 130 is shown as existing entirely in computer 100, memory 130 may in fact be remote memory that exists anywhere in network 122 or in a Local Area Network, not shown.

Computer 100 may be implemented using any suitable computer, such as an IBM personal computer running the OS/2® operating system. Computer 100 could be connected directly to network 122 via communications adapter 120 or could be connected indirectly, such as via a Local Area Network, not shown.

It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, it should be understood that the invention is not limited to the particular hardware designs, software designs, communications protocols, performance parameters, or application-specific functions disclosed herein.

In accordance with features of the preferred embodiment, internet agent program 132 and image color query manager 134 enable querying by image colors using a JPEG format among images from the internet. The method of the preferred embodiment uses Discrete Cosine Transform (DCT) function of the JPEG image format. JPEG images use the DCT to transform the image data into a spatial frequency domain, which organizes the DCT coefficient information from DC or average information to high-frequency or detail information.

Figure 2:
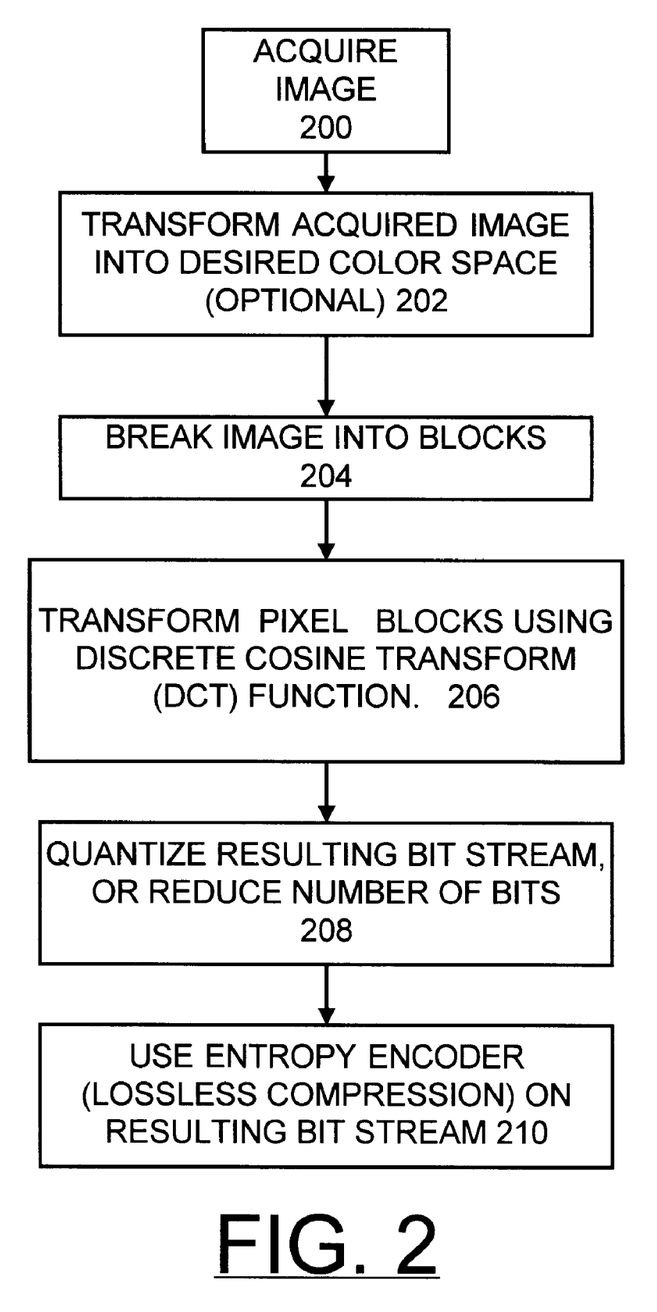
FIG. 2 is a flow chart illustrating exemplary sequential steps for creating a JPEG image in accordance with the method and apparatus of the preferred embodiment.

Referring to FIG. 2, there are shown sequential steps for creating a JPEG image in a specific JPEG format, in this case a baseline, sequential, DCT based format. An image is acquired as indicated at a block 200. The acquired image can be transformed into a desired color space as indicated at a block 202. The preferred color space is YCbCr because it provides improved compression. JPEG images are next broken up into 8x8 pixel blocks as indicated at a block 204. The color transformation can be either before or after breaking the image into blocks. Then the DCT is taken of each plane of each block as indicated at a block 206. Each value in the resulting bit stream is quantized or truncated based on a quantization table as indicated at a block 208. Entropy encoding (lossless compression) is applied to the truncated bit stream as indicated at a block 210.

Figure 3:
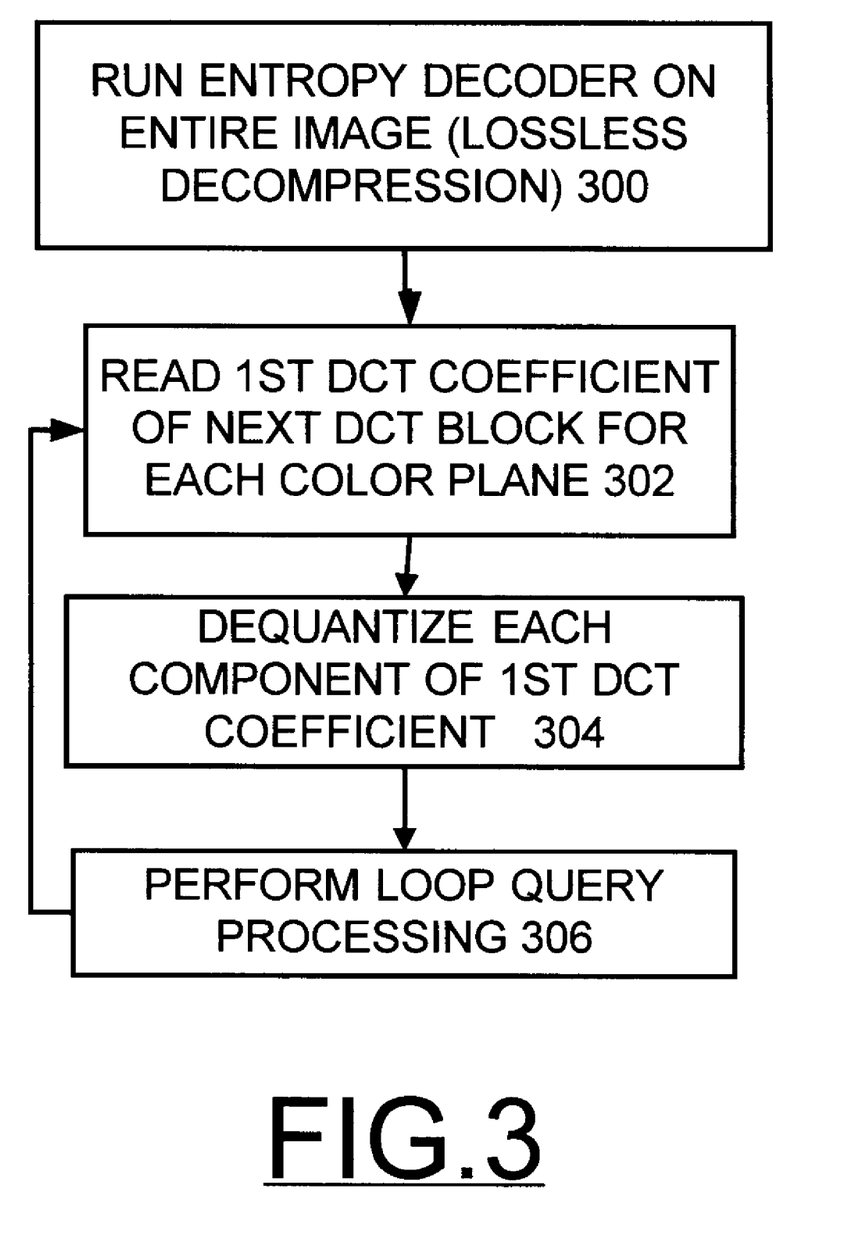
FIGS. 3, 4, 5, 6, 7, 8, 9 and 9A are flow charts illustrating sequential steps for querying by image colors using a JPEG format for images from the internet in accordance with methods of the preferred embodiment.

Referring now to FIG. 3, there are shown sequential steps for processing of a JPEG image. In FIG. 3, the JPEG image was created with the baseline process, including DCT based sequential encoding, with lossless compression coding applied to the resultant image stream, as shown in FIG. 2. An entropy decoder decodes an entire image for lossless decompression as indicated at a block 300. A first DCT coefficient is read for a next DCT block for each color plane as indicated at a block 302. Then each component of the first DCT coefficient is dequantized as indicated at a block 304. Loop query processing of the DCT coefficient is performed in accordance with the methods of the preferred embodiment as indicated at a block 306. Loop query processing at block 306 includes the computations and comparisons needed to determine if the DCT coefficient matches the desired color. For other variations of JPEG image with DCT, the decoding for lossless decompression step at block 300 and the dequantizing step at block 304 are optional steps and may not be performed. In FIG. 3, the DCT coefficients can be interleaved or non-interleaved, and any color space can be used. Also, the entropy decoding is not required to be done in a single step for the entire image.

Figure 4:
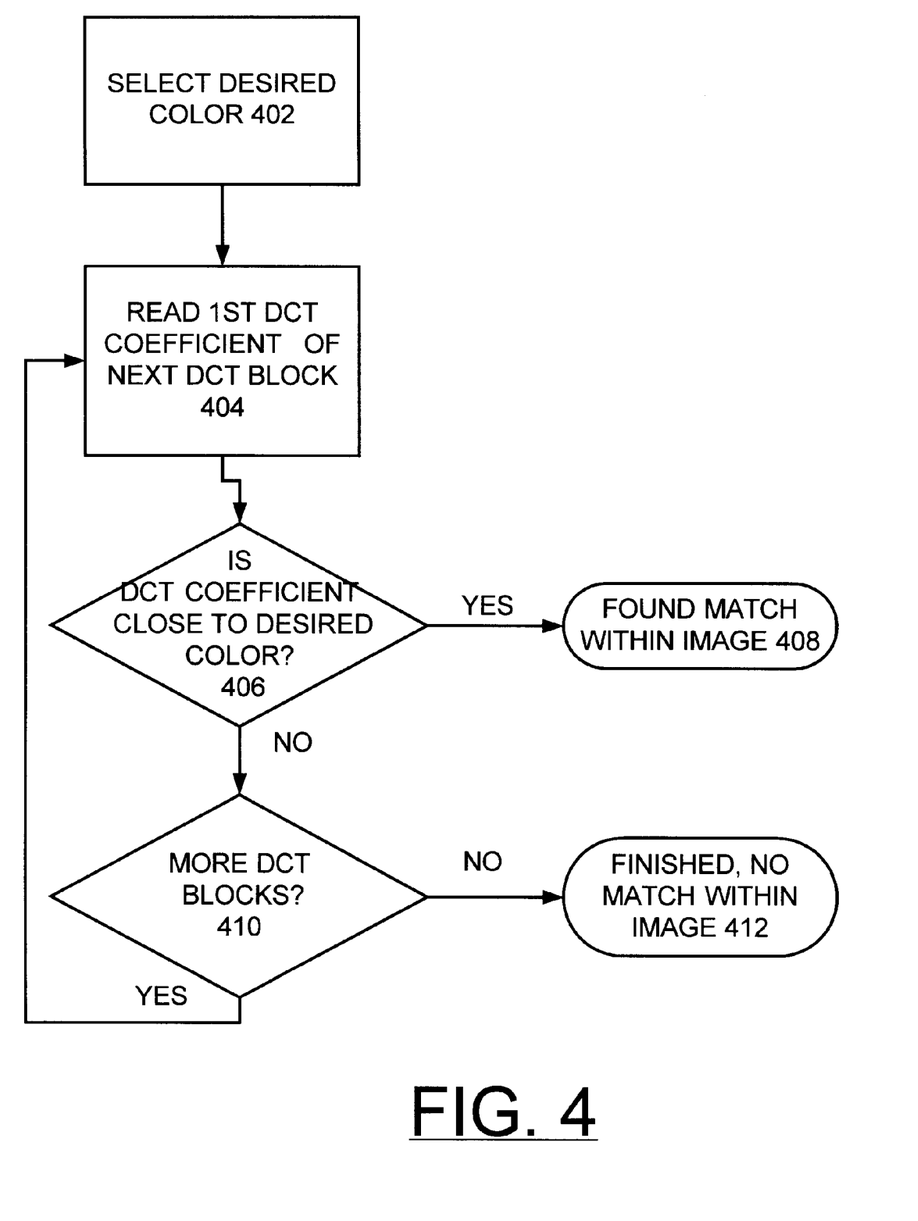

Referring now to FIG. 4, there are shown sequential steps for querying by image colors using a JPEG format for images from the internet in accordance with the preferred embodiment. First a desired image color is selected as indicated at a block 402. A first DCT coefficient of a next DCT block of the acquired image is read as indicated at a block 404. The acquired image DCT coefficient is compared with the selected image color as indicated at a decision block 406. If the acquired image DCT coefficient is close to the selected image color, then a match is found within the image being processed as indicated at a block 408. If the acquired image DCT coefficient is not close to the selected image color, then checking for more DCT blocks is performed as indicated at a decision block 410. If more DCT blocks are found, then the sequential operation return to block 404 to read the first DCT coefficient of the next DCT block. Otherwise, when no more DCT blocks are found; then the color image query processing is finished with no match found within the image as indicated at a block 412.

It should be understood that not all DCT blocks need be processed. One skilled in the art could apply conventional sampling techniques to process a subset of the DCT blocks.

Figure 5:
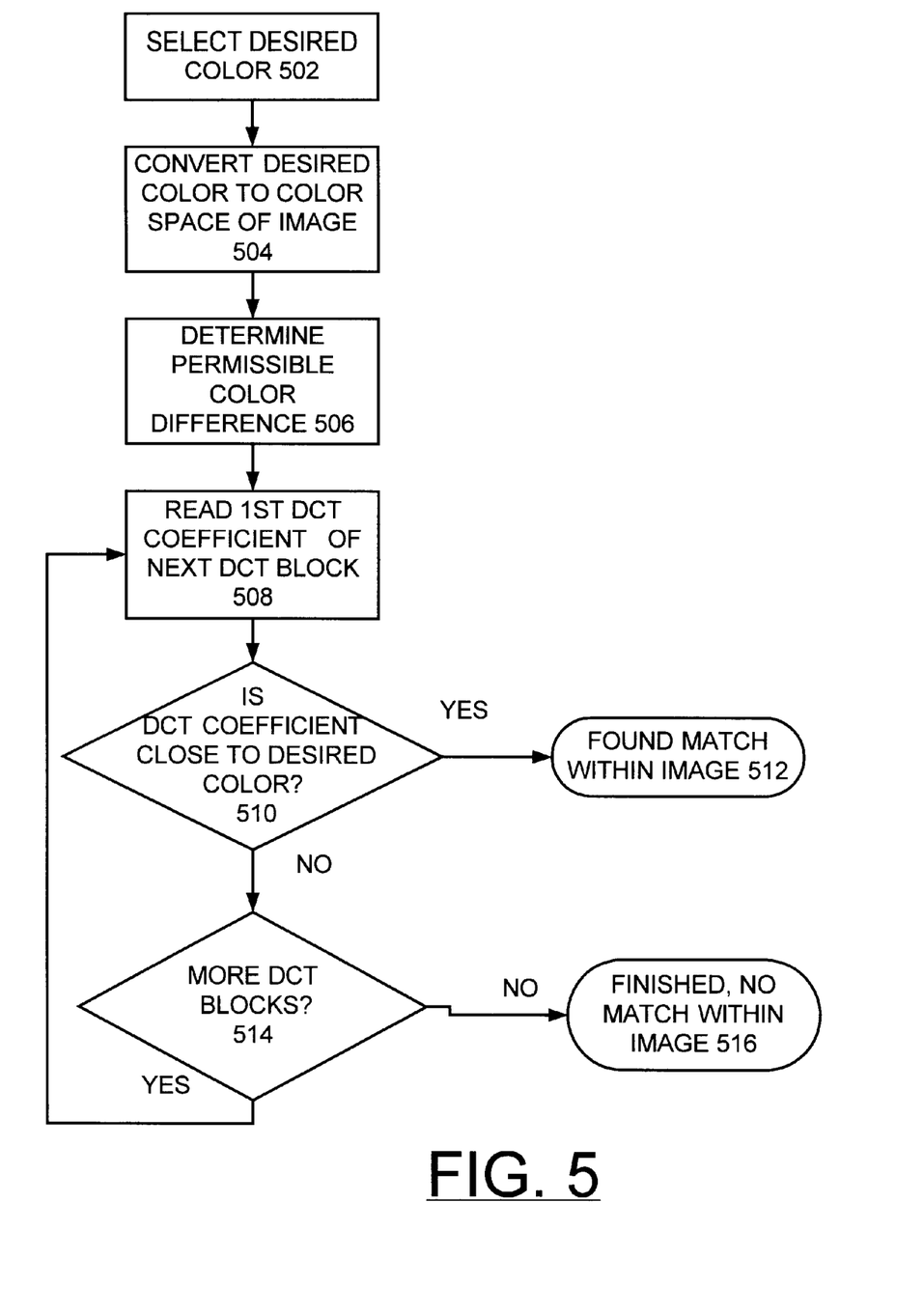

Referring now to FIG. 5, there are shown sequential steps for querying by image colors using JPEG formatted images in accordance with another method of the preferred embodiment. In the method of FIG. 5, additional steps are performed as indicated at blocks 504 and 506 as compared to the method of FIG. 4. As indicated at a block 504, the selected desired color obtained at block 502 is converted to a color space of the image. Then a permissible color difference is determined as indicated at a block 506. The loop query processing is performed at blocks 508, 510, 512, 514, and 516, as described above with respect to FIG. 4.

Figure 6:
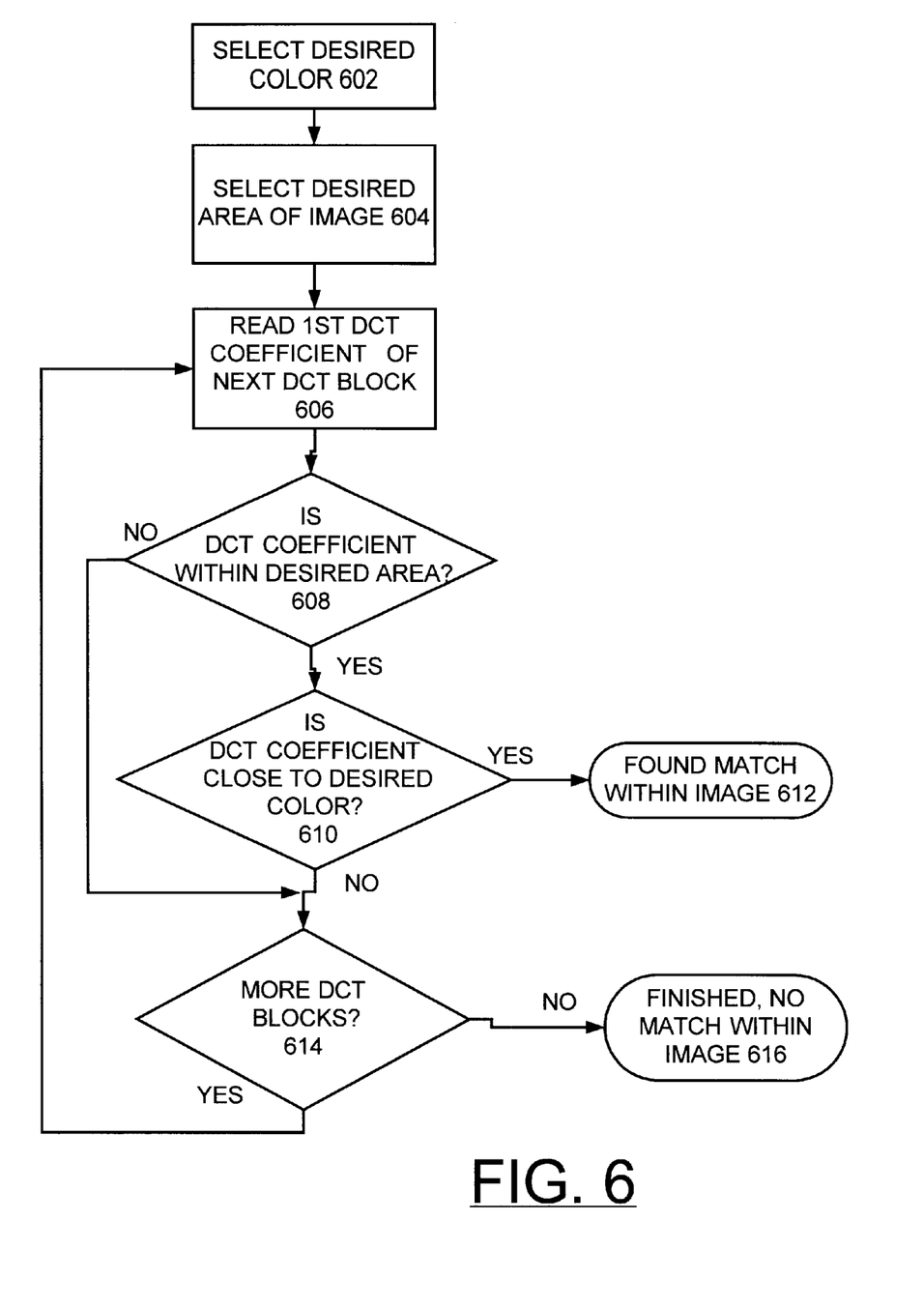

Referring now to FIG. 6, there are shown sequential steps for querying by image colors using JPEG formatted images in accordance with another method of the preferred embodiment. In the method of FIG. 6, additional steps are performed as indicated at blocks 604 and 608 as compared to the method of FIG. 4. In FIG. 6, first a desired image color is selected as indicated at a block 602. A desired area of the image is selected as indicated at a block 604. A first DCT coefficient of a next DCT block of the acquired image is read as indicated at a block 606. The acquired image DCT coefficient is compared with the selected desired image area as indicated at a decision block 608. If the DCT coefficient is within the desired image area, then the acquired DCT coefficient is compared with the desired color as indicated at a decision block 610. If the acquired image DCT coefficient is close to the selected image color, then a match is found within the image being processed as indicated at a block 612. If the DCT coefficient is not within the desired image area or if the acquired image DCT coefficient is not close to the selected image color, then checking for more DCT blocks is performed as indicated at a decision block 614. If more DCT blocks are found, then the sequential operation return to block 606 to read the first DCT coefficient of the next DCT block. Otherwise, when no more DCT blocks are found; then the color image query processing is finished with no match found within the image as indicated at a block 616.

Figure 7:
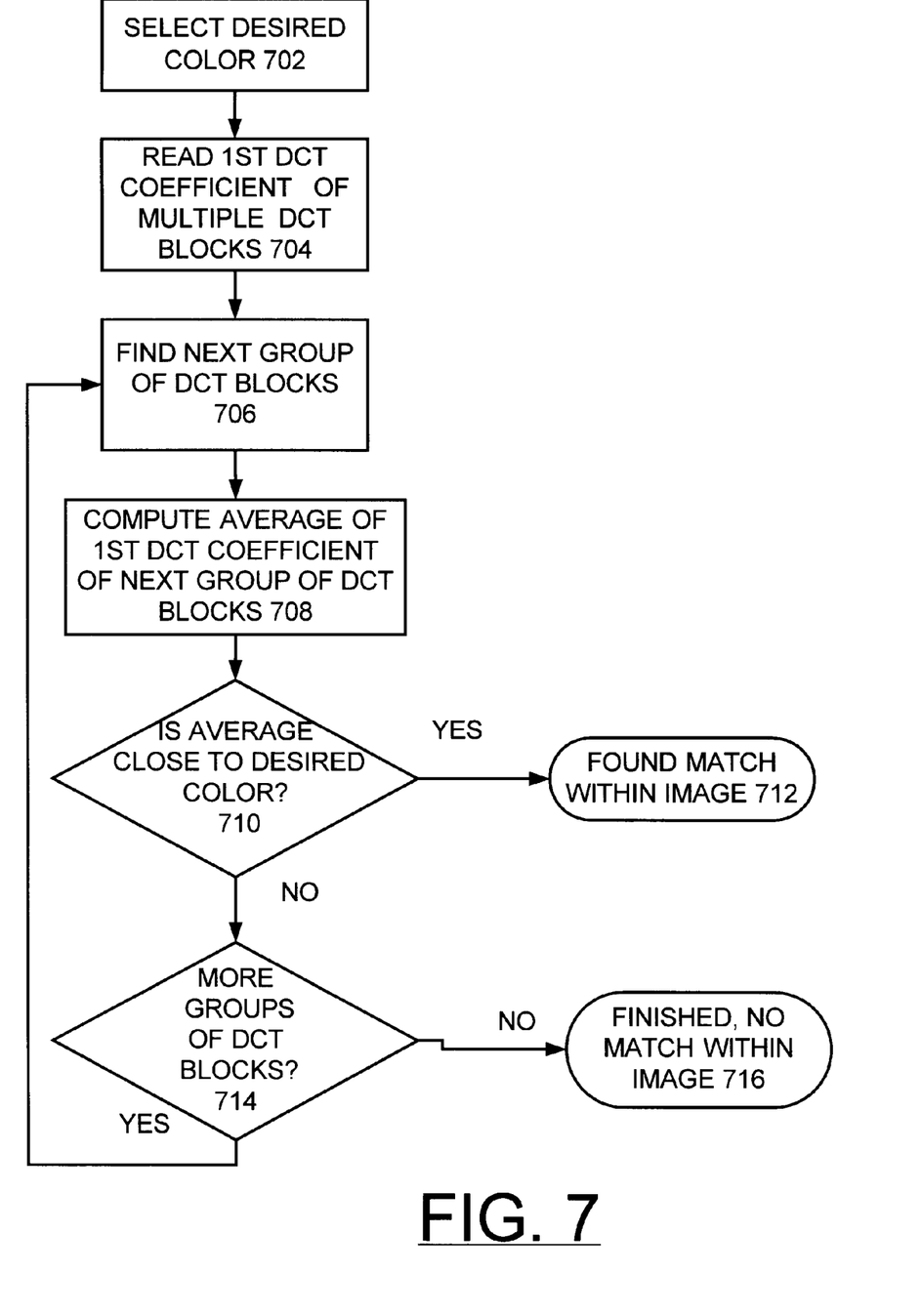

Referring now to FIG. 7, there are shown sequential steps for querying by image colors using JPEG formatted images in accordance with another method of the preferred embodiment. In accordance with a feature of the preferred embodiment searching for an average DCT coefficient color within an image is performed. For example, if searching for a certain fabric color among garments modeled by humans shown full size, a large region of the fabric would be the desired color, while individual DCT coefficient colors would vary because of the texture of the fabric and because of the lighting and shadows on the model. Often average colors which would remove distracting variables are more important. In FIG. 7, first a desired image color is selected as indicated at a block 702. Then a first DCT coefficient is read from multiple DCT blocks as indicated at a block 704. A next group of DCT blocks is found as indicated at a block 706. Then a weighted average of the first DCT coefficient of each block in the next group of DCT blocks is computed as indicated at a block 708. Then the computed average of the acquired image DCT coefficients is compared with the selected image color as indicated at a decision block 710. If the average is close to the selected image color, then a match is found within the image being processed as indicated at a block 712. If the acquired average is not close to the selected image color, then checking for more groups of DCT blocks is performed as indicated at a decision block 714. If more groups of DCT blocks are found, then the sequential operation return to block 706 to find the next group of DCT blocks. Otherwise, when no more groups of DCT blocks are found; then the color image query processing is finished with no match found within the image as indicated at a block 716. In FIG. 7, the groups of DCT blocks may be overlapping groups of DCT blocks.

Figure 8:
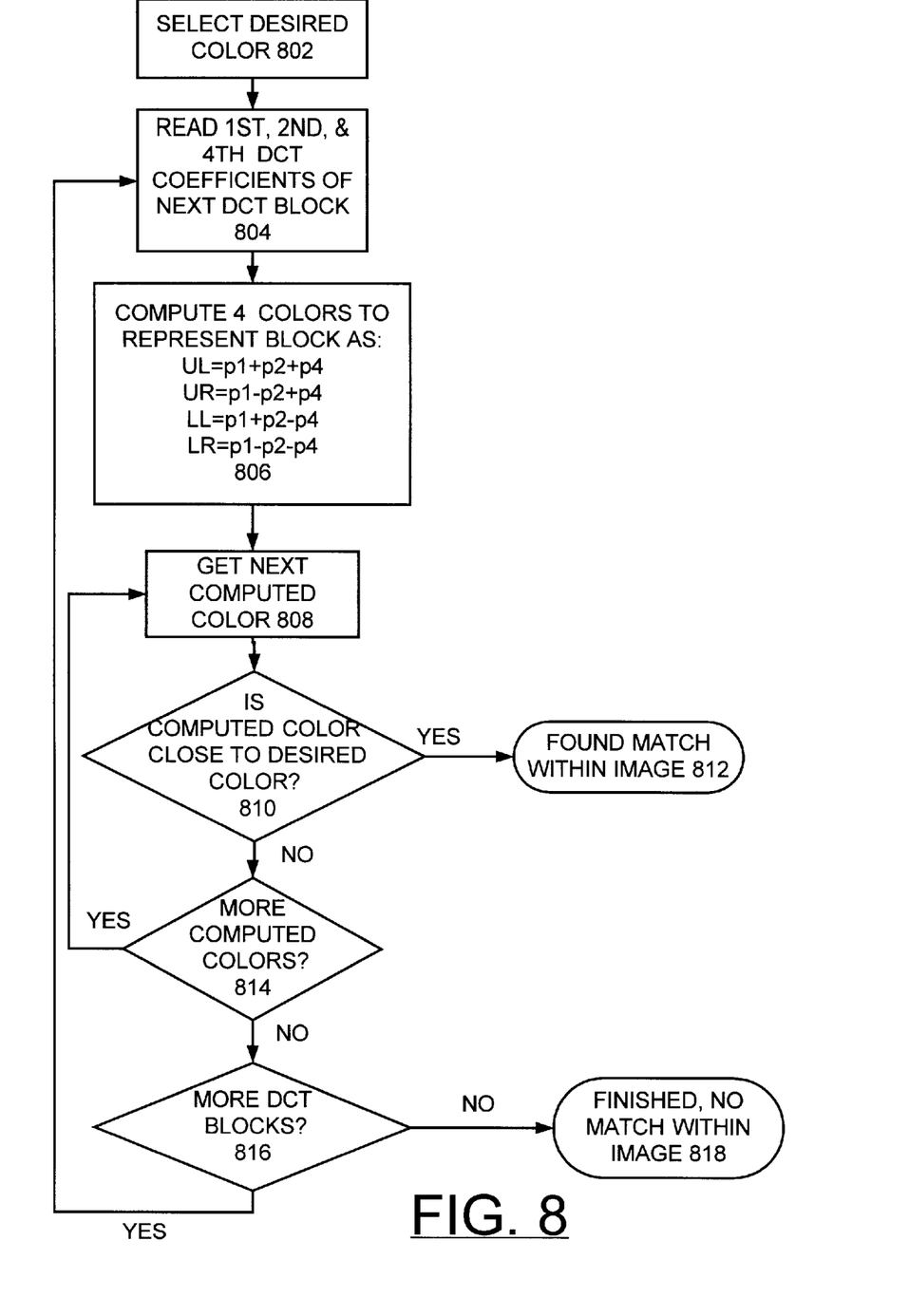

Referring now to FIG. 8, there are shown sequential steps for querying by image colors using JPEG formatted images in accordance with another method of the preferred embodiment. First a desired image color is selected as indicated at a block 802. Then a first DCT coefficient, a second DCT coefficient and a fourth DCT coefficient are read from a next DCT block as indicated at a block 804. Four colors are computed to represent each DCT block as indicated at a block 806. Then a next computed color is obtained as indicated at a block 808. The computed color is compared with the selected image color as indicated at a decision block 810. If the computed color is close to the selected image color, then a match is found within the image being processed as indicated at a block 812. If the computed color is not close to the selected image color, then checking for a next computed color is performed as indicated at a decision block 814. If another computed color is found, then the sequential steps return to block 808 to get the next computed color. When no more computed colors are found, then checking for more DCT blocks is performed as indicated at a decision block 816. If more DCT blocks are found, then the sequential operation return to block 806 to read the first, second and fourth DCT coefficients of the next DCT block. Otherwise, when no more DCT blocks are found; then the color image query processing is finished with no match found within the image as indicated at a block 818. It should be understood that a different number of colors could be computed to represent the DCT blocks by using a different number of DCT coefficients from the DCT blocks and computing a different number of combinations.

Figure 9:
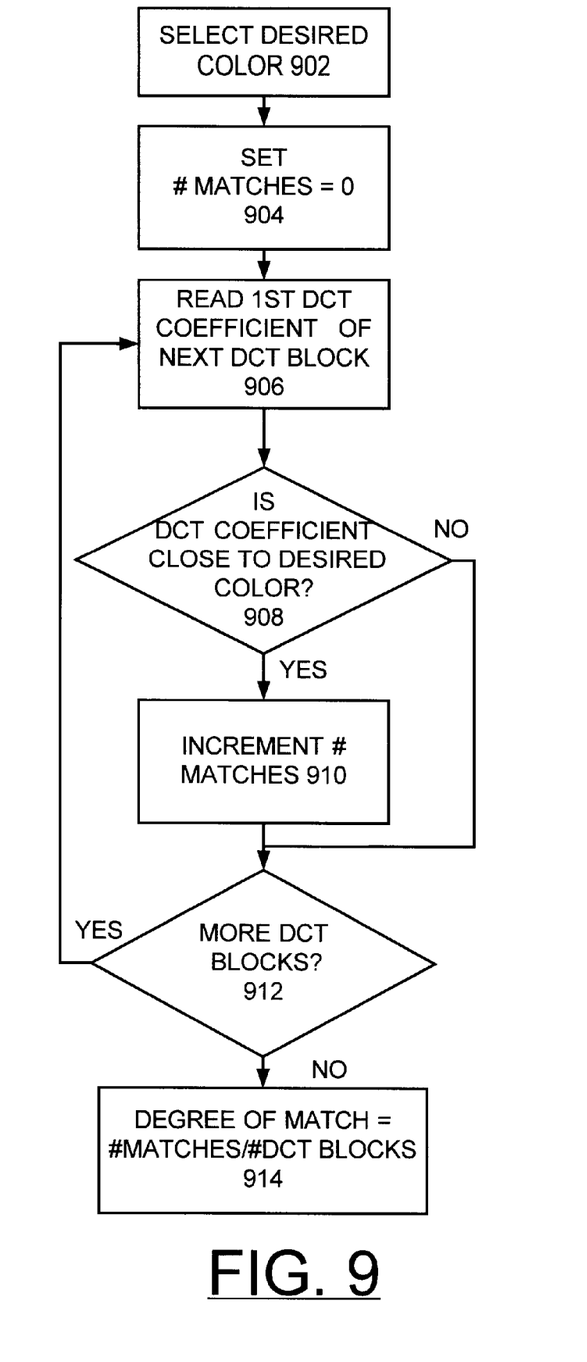

Referring now to FIG. 9, there are shown sequential steps for querying by image colors using JPEG formatted images in accordance with another method of the preferred embodiment. First a desired image color is selected as indicated at a block 902. Then a number of matches is initially set to zero as indicated at a block 904. A first DCT coefficient of a next DCT block of the acquired image is read as indicated at a block 906. The acquired image DCT coefficient is compared with the selected image color as indicated at a decision block 908. If the acquired image DCT coefficient is close to the selected image color, then a number of matches is incremented as indicated at a block 910. If the acquired image DCT coefficient is not close to the selected image color or after the number of matches is incremented, then checking for more DCT blocks is performed as indicated at a decision block 912. If more DCT blocks are found, then the sequential operation return to block 906 to read the first DCT coefficient of the next DCT block. Otherwise, when no more DCT blocks are found; then a degree of match is calculated by dividing the total number of matches by the number of DCT blocks to complete the color image query processing as indicated at a block 914.

Note that other techniques could be used to calculate the degree of match. For example, instead of using the illustrated match count at block 914, a match quality could be computed at block 910 based upon the closeness of the match in color space and summed and normalized to get the degree of match. Alternatively, matches could be searched for at various levels, that is, among DCT coefficients, among average DCT coefficients, and among computed values for multiple DCT coefficients within a block. Matches could be weighted according to their level and summed to get the degree of match. Alternatively, the match quality could be computed based on the closeness of the DCT coefficient to a desired position in the image and summed for various matches to compute the degree of match. Also a combination of these above methods could be used. The degree of match can be implemented as a lookup table to provide equivalent results.

Figure 9A:
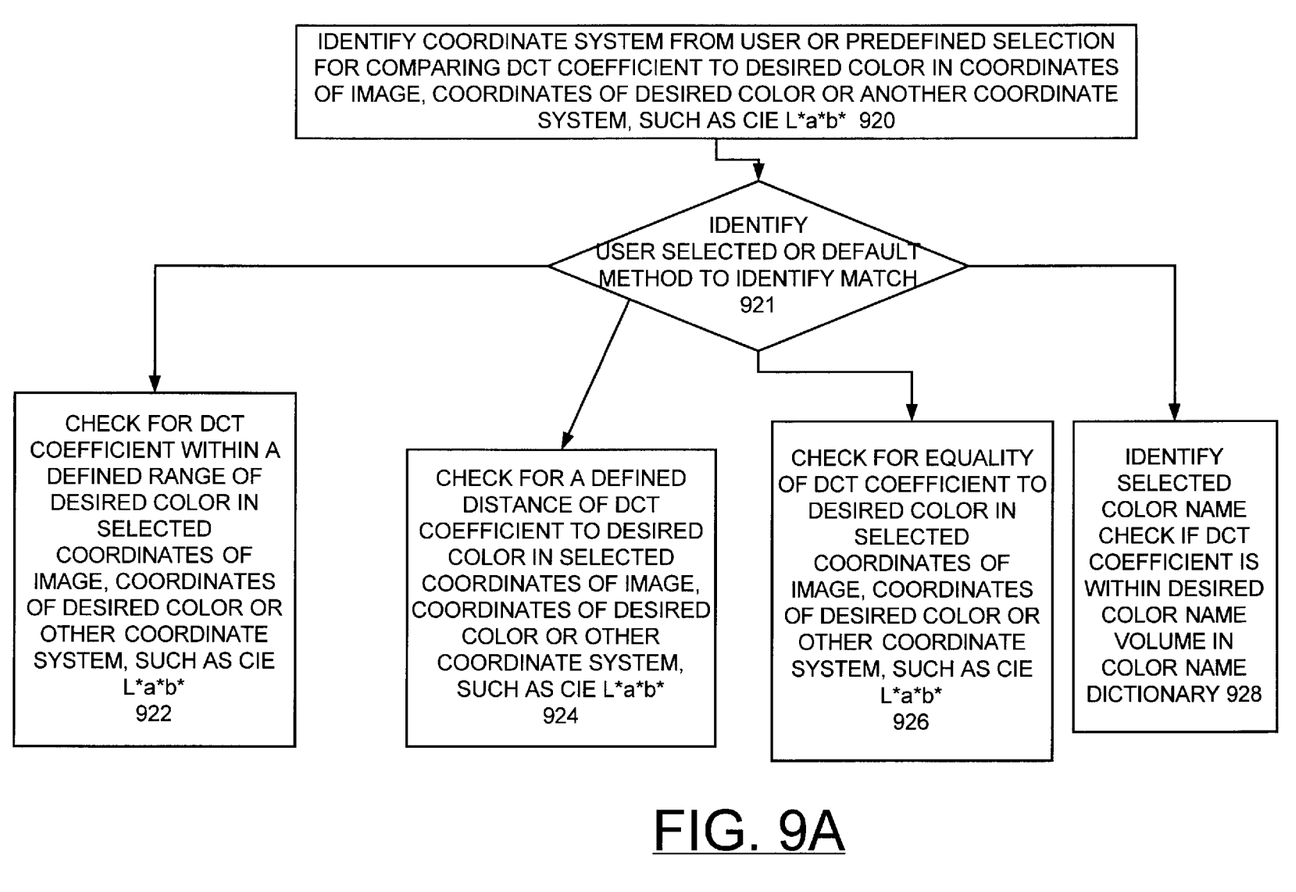

Referring now to FIG. 9A, there are shown exemplary more detailed alternative steps performed in accordance with the preferred embodiment to determine whether an acquired DCT coefficient or DCT coefficient average is close to the selected image color. As indicated at a block 920, a coordinate system is identified from a user selection or a default selection in the coordinates of the image, of the desired color or another coordinate system, such as CIE L*a*b* that is used for comparing and determining whether the acquired DCT coefficient or DCT coefficient average is close to the selected image color. As indicated at a decision block 921, a user selected or default method is identified that is used for determining whether the acquired DCT coefficient or DCT coefficient average is close to the selected image color to identify a match.

Checking that the acquired DCT coefficient or DCT coefficient average is within a defined range of the selected image color in the selected coordinates of the image, of the desired color or another coordinate system, such as CIE L*a*b* is performed as indicated at a block 922.

Checking that the acquired DCT coefficient or DCT coefficient average is within a defined distance of the selected image color in the selected coordinates of the image, of the desired color or another coordinate system, such as CIE L*a*b* is performed as indicated at a block 924. For example, the square root of the sum of the squares of distance in each independent coordinate axis can be used in checking that the acquired DCT coefficient or DCT coefficient average is within a defined distance of the selected image color.

Checking for equality of the acquired DCT coefficient or DCT coefficient average to the selected image color in the selected coordinates of the image, of the desired color or another coordinate system, such as CIE L*a*b* is performed as indicated at a block 926.

Identifying a selected color name and checking whether the acquired DCT coefficient or DCT coefficient average is within the selected image color name volume in a color name dictionary is performed as indicated at a block 928. A color name dictionary and color name volumes are provided as disclosed in copending U.S. patent application Ser. No. 08/749,150 filed Nov. 14, 1996 by Helen R. Delp and entitled "METHOD AND APPARATUS FOR CREATING A COLOR NAME DICTIONARY AND FOR QUERYING AN IMAGE BY COLOR NAME." The subject matter of the above-identified patent application is incorporated herein by reference.

It should be understood that in certain situations for reasons of computational efficiency or ease of maintenance, the ordering of the blocks of the illustrated flow charts could be rearranged or moved inside or outside of the illustrated loops by one skilled in the art. It is possible that the coordinate system of the image and/or the coordinate system of the desired color would be unknown. For this reason or for reasons of computational efficiency, it could be assumed that the coordinate systems of the image and the desired color are the same.

Figure 10:
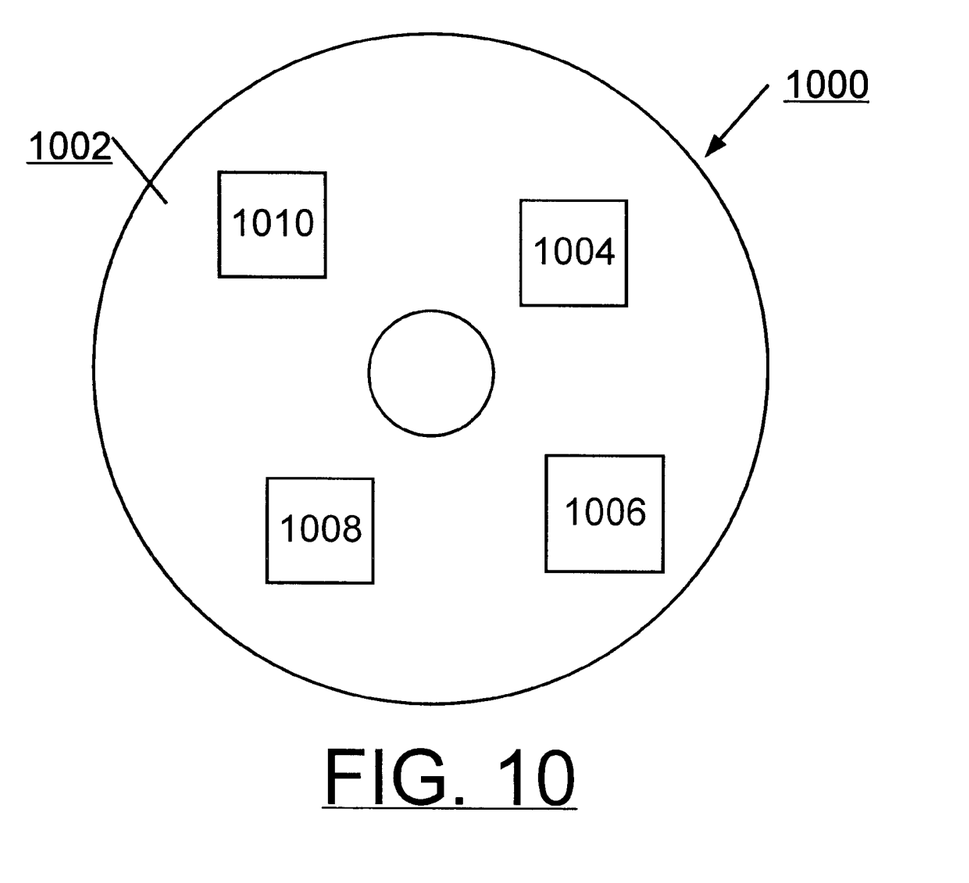
FIG. 10 is a block diagram illustrating a computer program product in accordance with the preferred embodiment.

Referring now to FIG. 10, an article of manufacture or a computer program product 1000 of the invention is illustrated. The computer program product 1000 includes a recording medium 1002, such as, a floppy disk, a high capacity read only memory in the form of an optically read compact disk or CD-ROM, a tape, a transmission type media such as a digital or analog communications link, or a similar computer program product. Recording medium 1002 stores program means 1004, 1006, 1008, 1010 on the medium 1002 for carrying out the methods for querying by image colors using a JPEG format for images of the preferred embodiment in the system 100 of FIG. 1.

A sequence of program instructions or a logical assembly of one or more interrelated modules defined by the recorded program means 1004, 1006, 1008, 1010, direct the computer system 100 for querying by image colors using a JPEG format for images from the internet of the preferred embodiment.

While the present invention has been described with reference to the details of the embodiments of the invention shown in the drawing, these details are not intended to limit the scope of the invention as claimed in the appended claims.

What is claimed is:

1. A method for querying by image colors using Joint Photographic Experts Group (JPEG) format for images comprising the steps of:

selecting an image color;

acquiring a plurality of Discrete Cosine Transform (DCT) coefficients from a JPEG image;

converting said acquired plurality of DCT coefficients to a selected coordinate system of said selected image color;

comparing said converted DCT coefficients with said selected image color; and identifying a match within the JPEG image responsive to said converted DCT coefficients being near said selected image color.

2. A method for querying by image colors using Joint Photographic Experts Group (JPEG) format for images from the internet as recited in claim 1 further includes the step of converting said selected image color to a selected coordinate system of said image.

3. A method for querying by image colors using Joint Photographic Experts Group (JPEG) format for images from the internet as recited in claim 1 wherein the step of identifying said match within the JPEG image is responsive to said converted DCT coefficients being within a predefined distance of said selected image color.

4. A method for querying by image colors using Joint Photographic Experts Group (JPEG) format for images from the internet as recited in claim 1 wherein the step of identifying said match within the JPEG image is responsive to said converted DCT coefficients being equal to said selected image color.

5. A method for querying by image colors using Joint Photographic Experts Group (JPEG) format for images from the internet as recited in claim 1 further includes the steps of identifying a selected area of an image; comparing converted DCT coefficients with said selected area of said image; and wherein the step of comparing said converted DCT coefficients with said selected image color is responsive to identified converted DCT coefficients being within said selected area of said image.

6. A method for querying by image colors using Joint Photographic Experts Group (JPEG) format for images from the internet as recited in claim 1 wherein said step of acquiring said plurality of DCT coefficients from said JPEG image includes the steps of acquiring a plurality of DCT coefficients of multiple DCT blocks within said JPEG image, identifying a group of DCT blocks, and computing a weighted DCT coefficient average of said group of DCT blocks and wherein said step of comparing said converted DCT coefficients with said selected image color includes the step of comparing said converted DCT coefficients for said computed weighted DCT coefficient average of said group of DCT blocks with said selected image color.

7. A method for querying by image colors using Joint Photographic Experts Group (JPEG) format for images from the internet as recited in claim 1 wherein said step of acquiring said Plurality of DCT coefficients from a JPEG image includes the steps of acquiring a plurality of DCT coefficients from a plurality of DCT blocks within said JPEG image; and wherein said step of identifying said match within the JPEG image responsive to said converted DCT coefficients being near said selected image color further includes the steps of calculating a match quality value responsive to each identified match of said converted DCT coefficients and said selected image color; and responsive to said calculated match quality value, calculating a degree of match.

8. A computer program product for use in a computer system comprising:

a recording medium;

means, recorded on the recording medium, for selecting an image color;

means, recorded on the recording medium, for acquiring a plurality of Discrete Cosine Transform (DCT) coefficients from a JPEG image;

means, recorded on the recording medium, for converting said acquired plurality of DCT coefficients to a selected coordinate system of said selected image color;

means, recorded on the recording medium, for comparing said converted DCT coefficients with said selected image color; and means, recorded on the recording medium, for identifying a match within the JPEG image responsive to said converted DCT coefficients being near said selected image color.

9. A computer program product as recited in claim 8 wherein said means, recorded on the recording medium, for acquiring said plurality of DCT coefficients from said JPEG image include means, recorded on the recording medium, for acquiring a plurality of DCT coefficients from a plurality of DCT blocks within said JPEG image; and further include means, recorded on the recording medium, for calculating a match quality value responsive to each identified match of said converted DCT coefficients and said selected image color; and means, recorded on the recording medium, responsive to said calculated match quality value for calculating a degree of match.

10. A computer program product as recited in claim 8 wherein said means, recorded on the recording medium, for acquiring said Plurality of DCT coefficients from said JPEG image includes means, recorded on the recording medium, for acquiring a plurality of DCT coefficients of a plurality of DCT blocks within said JPEG image, for identifying a group of DCT blocks, and for computing a weighted DCT coefficient average of said group of DCT blocks and wherein said means, recorded on the recording medium, for comparing said converted DCT coefficients with said selected image color includes means, recorded on the recording medium, for comparing said converted DCT coefficients for said computed weighted DCT coefficient average of said group of DCT blocks with said selected image color.

11. A computer program product as recited in claim 8 wherein said means, recorded on the recording medium, for identifying said match within the JPEG image responsive to said converted DCT coefficients being near said selected image color include means, recorded on the recording medium, for identifying a predefined distance or for identifying a predefined range, and wherein said means, recorded on the recording medium, for identifying said match within the JPEG image is responsive to said converted DCT coefficients being within said predefined distance or within said predefined range of said selected image color.

12. A computer system having apparatus for querying by image colors using Joint Photographic Experts Group (JPEG) format for images comprising:

a processor, a memory;

a communications adapter;

a bus connecting said processor, memory, and communications adapter;

means for selecting an image color;

means for acquiring a plurality of Discrete Cosine Transform (DCT) coefficients from a JPEG image;

means for converting said acquired plurality of DCT coefficients to a selected coordinate system of said selected image color; means for comparing said converted DCT coefficients with said selected image color; and means for identifying a match within the JPEG image responsive to said converted DCT coefficients being near said selected image color.

\* \* \* \* \*